United States Patent [19]
Mottishaw et al.

[11] Patent Number: 6,078,584
[45] Date of Patent: *Jun. 20, 2000

[54] METHOD AND APPARATUS FOR RELIEVING THE LOADING OF A SERVICE FUNCTION NODE IN A TELECOMMUNICATIONS SIGNALLING NETWORK

[75] Inventors: Peter John Mottishaw, South Queensferry; Douglas John Carson, Edinburgh; James Robertson Galloway, Scone; Salih Kabay, Edinburgh, all of United Kingdom

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,115

[22] Filed: Feb. 20, 1997

[30] Foreign Application Priority Data

Jun. 26, 1996 [GB] United Kingdom ............... 9613434

[51] Int. Cl.[7] ..................................................... H04J 3/12
[52] U.S. Cl. ........................ 370/385; 370/522; 379/230; 379/213
[58] Field of Search ........................... 370/410, 522, 370/524, 385; 379/210, 211, 212, 213, 229, 230

[56] References Cited

FOREIGN PATENT DOCUMENTS

| 0 669 771 A1 | 8/1995 | European Pat. Off. . |
| 0 708 570 A2 | 4/1996 | European Pat. Off. . |
| 0 710 042 A2 | 5/1996 | European Pat. Off. . |
| WO 95/35633 | 12/1995 | WIPO . |

*Primary Examiner*—Chi H. Pham
*Assistant Examiner*—Frank Duong

[57] ABSTRACT

In order to relieve the loading of a service control point SCP in a telecommunications signalling network, query messages addressed to the SCP are intercepted prior to receipt by the SCP. These intercepted query messages are examined and response data generated, at least for certain query types. For a query message for which response data is generated, the query message is replaced by a response message addressed to the querying entity. The response message is then forwarded on in the same sense as the received query message. In a preferred implementation, the forwarded response message will next be received by a signalling transfer point STP and be directed back to the querying entity.

11 Claims, 7 Drawing Sheets

METHOD AND APPARATUS FOR RELIEVING THE LOADING OF A SERVICE FUNCTION NODE IN A TELECOMMUNICATIONS SIGNALLING NETWORK

TECHNICAL FIELD

The present invention relates to a method and apparatus for use in relieving the loading of a service function node in a telecommunications signalling network. In particular, but not exclusively, the present invention relates to relieving the loading of a service control point in a signalling network operating substantially in accordance with Signalling System No.7, whether as specified by the CCITT, ANSI, ETSI (for GSM), Bellcore or similar body, such a network being herein referred to as an SS7 network. The CCITT Signalling System Number 7 is specified in Recommendations Q.700–Q.716 CCITT Volume VI—Fascicle VI.7, Geneva 1989, ISBN 92-61-03511-6 which is herein incorporated by reference.

BACKGROUND OF THE INVENTION

Signalling in Modern Telecommunications Systems

In modern switched telecommunication systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network. In practice such signalling networks comprise high-speed computers interconnected by signalling links; computer programs control the computers to provide a set of operational and signalling functions in accordance with a standardized protocol. One example of such a signalling protocol is the afore-mentioned Signalling System No. 7 (SS7) which is being extensively deployed for control of telephone and other data transmission networks. An SS7 network basically comprises various types of signalling points, namely, signalling end points (SEPs) and signalling transfer points (STPs) interconnected by signalling links, the SEPs being associated for example with respective service switching points (SSPs) of the transmission network, and with service control points (SCPs).

Figure 1:
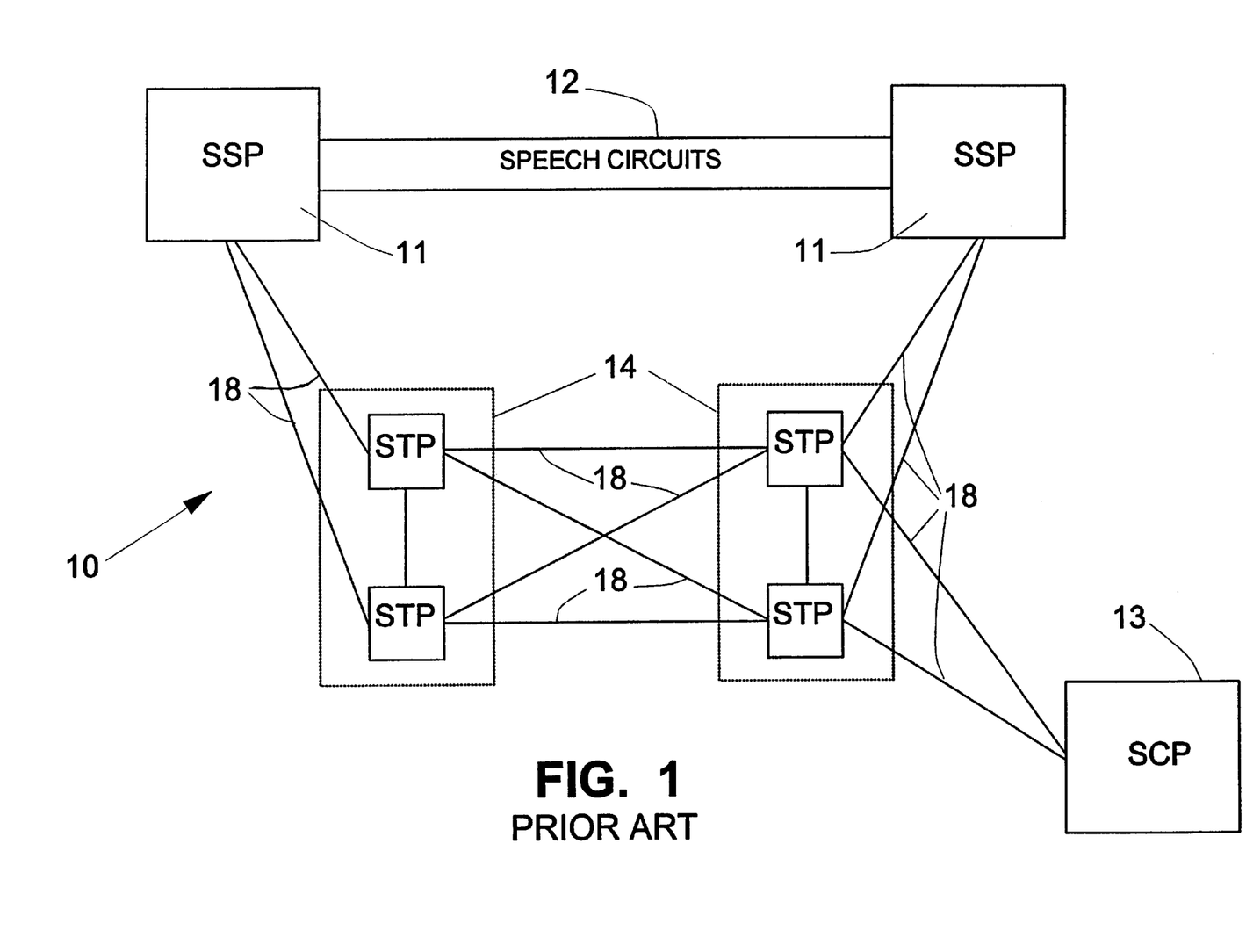
FIG. 1 is a diagram illustrating the main components of a standard SS7 signalling system.

Referring to FIG. 1, an SS7 network 10 is shown intercommunicating three signalling end points constituted by two service switching points SSPs 11 (between which extend speech circuits 12 of a transmission network not further illustrated) and a service control point SCP 13. The SCP serves to implement particular services (sometimes called IN, or Intelligent Network, services) in response to service requests received from an SSP, such a service request being generated by an SSP upon certain trigger conditions being met in the SSP in respect of a call that it is handling. A typical service may involve the translation of the dialled number (called party number) to a different number, the SCP returning this latter number to the SSP to enable the latter to complete call setup.

The SS7 network 10 includes two pairs 14 of signalling transfer points STPs, and a plurality of link sets 18 interconnecting the SSPs, SCP and STPs into a redundant network. Each signalling link set 18 is made up of one or more individual signalling links, the number of signalling links in a link set being chosen to provide appropriate capacity for the level of signalling traffic expected. The redundancy provided in respect of the STPs and links is to ensure that the failure of a single component of the network core does not cause the whole network to fail.

It should be noted that an SS7 network will typically comprise more STP pairs, SSPs and SCPs than illustrated. Service control functionality, as well as being provided in an SCP, can be provided in an Adjunct directly connected to an SSP.

Messages traversing the links of the network may be any of a large number of different types, depending on the nature of the call to which the message relates and the function specified by the message.

The SS7 Architecture

In order to facilitate an understanding of the present invention, a brief review will be given of the layered structure of the SS7 architecture and of the messages passed over the links of the network 10 to implement the SS7 architecture.

Figure 2:
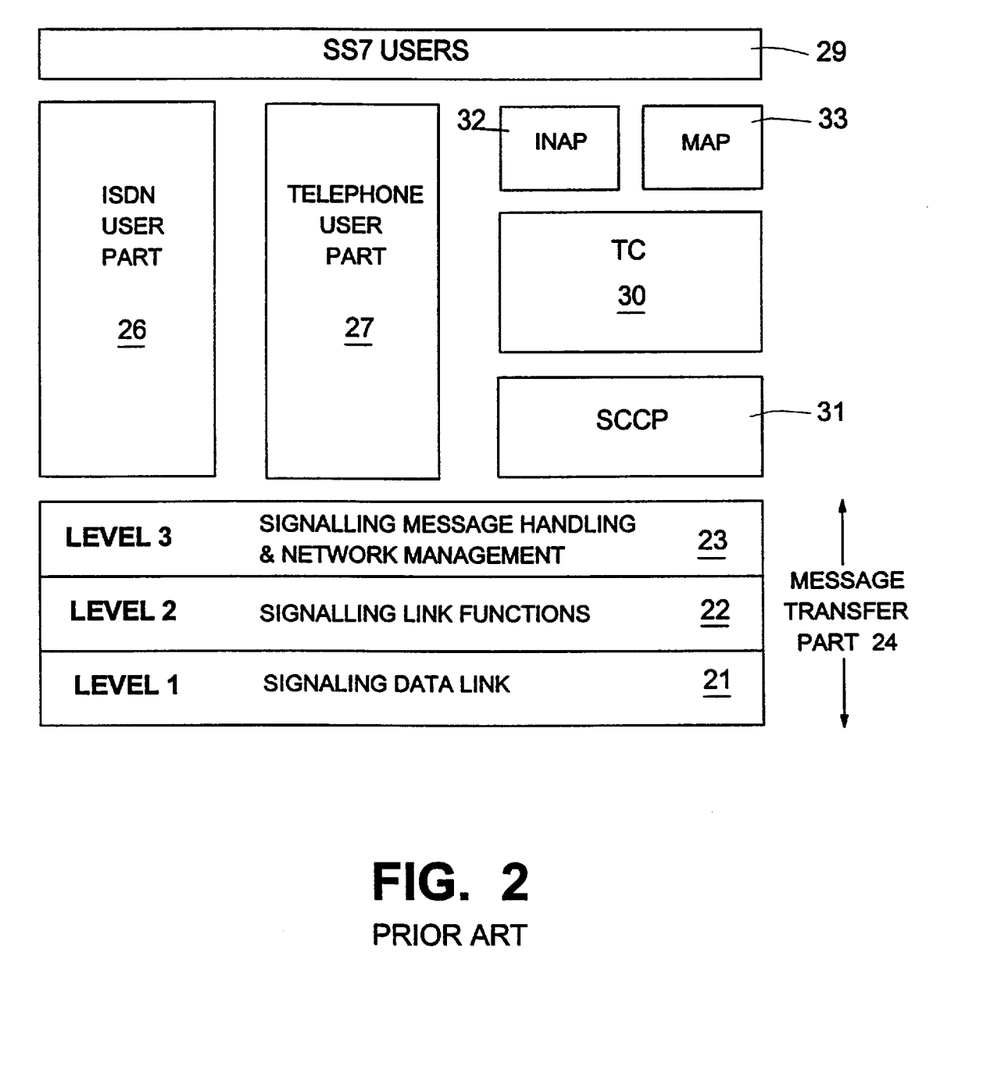
FIG. 2 is a diagram illustrating the basic architecture of the SS7 protocol.

FIG. 2 illustrates the SS7 architecture. Levels 1 to 3 (referenced 21, 22, 23) form the message transfer part (MTP) 24. The MTP 24 is responsible for transferring signalling information between signalling points in messages. Level 4 (not referenced as a whole) comprises circuit-related user parts, namely ISDN User Part (ISUP) 26 and Telephone User Part (TUP) 27. These user parts define the meaning of the messages transferred by the MTP 24 and provide functionality to the users of SS7 (block 29). The user parts 26 and 27 are specific to particular types of circuit-related applications as indicated by their names. In fact, the ISUP is the most important user part, the TUP being a subset of ISUP and having been largely replaced by the latter. Most inter-exchange signalling, such as between SSPs 11 in FIG. 1, uses ISUP messages.

As well as the circuit-related user parts, SS7 level 4 also includes functional elements defining a general protocol for non-circuit-related information, such as operations, maintenance and administration information or network database information. The main functional element in this Level 4 protocol is the Transaction Capabilities (TC) 30 which sits on top of a Signalling-Connection-Control Part (SCCP) 31 and beneath a TC Users element 32.

The SCCP 31 actually forms part of the transfer mechanism for non-circuit-related applications, combining with MTP 24 to provide transfer mechanisms (both connectionless and connection oriented) meeting the Open Systems Interconnection (OSI) Layer 3/4 boundary requirements. TC 30 itself comprises two elements, namely an intermediate-services part (ISP) and a transaction-capabilities application part (TCAP); ISP is only used for connection-oriented services. Users of the SCCP/TC stack include the INAP (Intelligent Network Application Part) 32 and MAP (Mobile Application Part) 33. With reference to FIG. 1, messages passed between an SSP 11 (FIG. 1) and SCP 13 will be INAP messages using SCCP/TC (in fact, such messages are generally concerned with real time query/response transactions for which a connectionless service is most appropriate so that only the TCAP part of TC is used). Some inter-exchange signalling may also use SCCP/TC messages where, for example, the purpose of the signalling is service related rather than circuit related. ISUP may also use the SCCP for certain messages.

Considering the MTP 24 in a little more detail, Level 1 (reference 21) defines the physical, electrical and functional characteristics of the transmission path for signalling. MTP Level 2 (reference 22) defines the functions and procedures for the transfer of signalling messages over a link between two directly-connected signalling points. MTP Level 3 (reference 23) provides functions for the reliable transfer of signalling information from one signalling end point to another. Thus, Level 3 is responsible for those functions that are appropriate to a number of signalling links, these being separable into signalling-message handling functions and signalling-network management functions.

When considering the passing of messages over a single link, it is the combination of Levels 1 and 2 that provides for the reliable transfer of signalling information. The Level 2 functions provide a framework in which the information is transferred and performs error-detection and error-correction processes; the Level 2 functions are carried out afresh on a link-by-link basis. At Level 2, information is seen as being transferred between signalling points in messages known as "signal units".

Figure 3:
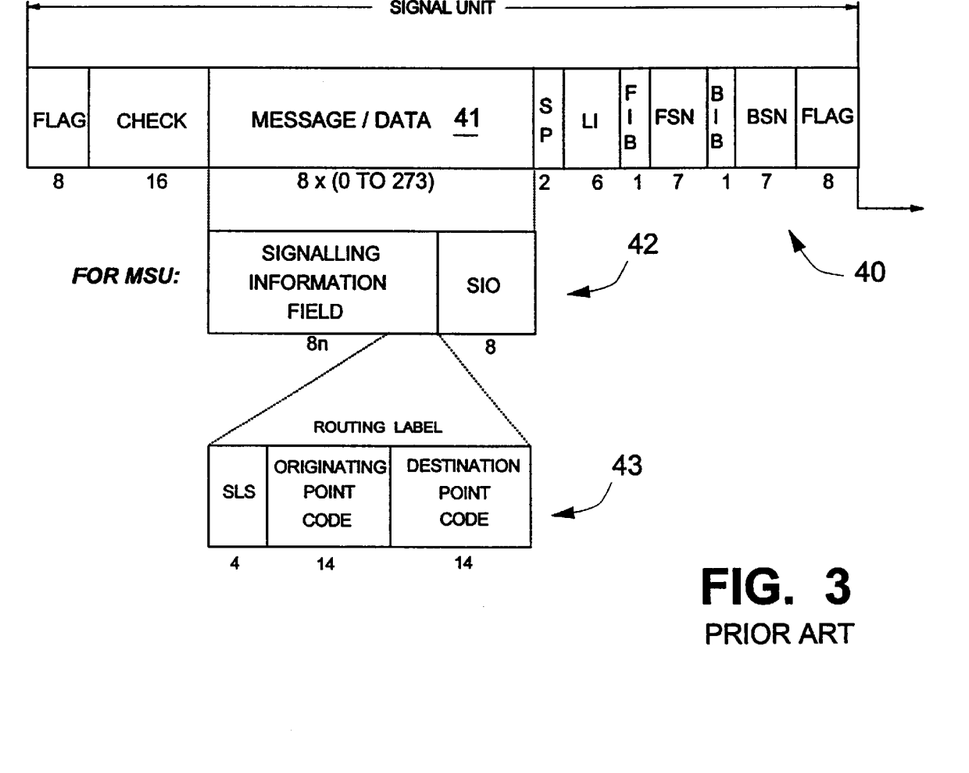
FIG. 3 is a diagram showing the format of an SS7 message signalling unit (MSU)

The general form of a signal unit 40 is shown in FIG. 3. As can be seen, a field 41 carrying message/data is encapsulated in a Level 2 framework comprising the following fields: a flag field; a backward sequence number field (BSN); a backward-indicator bit (BIB); a forward sequence number field (FSN); a forward-indicator bit (FIB); a length indicator field (LI); a spare field (SP); a check field; and a terminating flag field. The FSN, FIB, BSN, BIB and check fields provide error correction functionality at link level in a manner well understood by persons skilled in the art.

There are three types of signalling unit:

MSU—the Message Signal Unit—MSUs carry all service/application data sent on the SS7 network. The amount of data per MSU is limited to 273 octets maximum.

LSSU—the Link Status Signal Unit—LSSUs carry information relating to the status of the link and are therefore concerned with Level 2 functions. Normally, LSSUs are only seen during the initial alignment procedure when a link is brought into service but are used at other times, for example, to stop the flow of signal units when processors are busy.

FISU—the Fill-In Signal Unit—When no MSUs or LSSUs are to be sent, a signalling point continually sends FISUs. FISUs carry basic Level 2 information only, for example, the acknowledgement of the last MSU (field 41 is empty).

The length indicator (LI) within each message indicates the signal unit type as follows: LI=0 means FISU; LI=1 or 2 means LSSU; and LI=3 or more means MSU.

Each MSU carries a service information octet SIO and a signalling information field. The SIO field includes a Service Indicator sub-field that defines the user part or equivalent appropriate to the message. The SIF contains the information being transferred and will generally include a routing label 43 comprising a destination point code (DPC) indicating the destination signalling end point, an originating point code (OPC) indicating the originating signalling end point, and a signalling link selection field for specifying a particular link in cases where two signalling points are linked by a multiple-link link set. The MTP 24 is not aware of the contents of the SIF other than the routing label.

Figure 4:
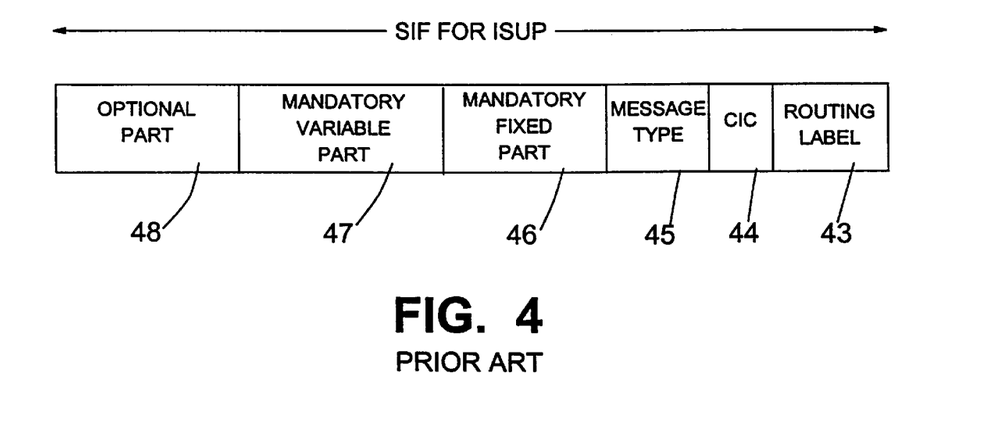
FIG. 4 is a diagram showing the format of a Unitdata SCCP message.

Of interest to the present invention are the query/response transaction messages exchanged with an SCP; as indicated above, these messages use the SCCP and each SCCP-level message is encapsulated in the SIF field of an MSU as is illustrated in FIG. 3. As well as the routing label 43 described above, an SCCP message comprises a message type field 45 and a number of parameters organised into three parts 46, 47, 48 according to type. Mandatory parameters of fixed length are placed in the mandatory fixed part 46. Mandatory parameters of variable length are placed in the variable mandatory part 47. Optional parameters are placed in the optional part 48. For SCP query/response transactions, the type of SCCP message used is the "Unitdata" message which utilises a connectionless service. FIG. 4 illustrates the general form of a Unitdata message. Apart from the message type, the only mandatory fixed parameter is the protocol class parameter (in this case indicating that a connectionless service is required). The mandatory variable part comprises three parameters (called party number, calling party number and data), the starts of which are indicated by pointers placed at the beginning of the mandatory variable part. It is the data parameter that carries the query/response TCAP messages. There are no optional parameters (and thus no optional part 48) in a Unitdata message.

Service Provision

The general process of service provision in a modern PSTN has already been outlined above, this process involving the generation by an SSP of a service request that is then passed to service control functionality (generally either in the form of an SCP or an Adjunct). In fact, many if not most services are basically query/response transactions involving, for example, the translation of a dialled number to another number; thus, the functionality provided by the node receiving the service request is often little more than a database lookup.

To facilitate an understanding of the present invention, a more specific example of a known service will next be described.

A service that is currently attracting much attention is number portability. The reason for this interest is that Local Number Portability (LNP) has become a regulatory requirement in the USA. LNP is intended to allow subscribers to move between LECs (Local Exchange Carriers) whilst retaining their existing telephone numbers, within a rating area.

AT&T has proposed an LNP solution using a Location Routing Number (LRN). This solution relies on switched-based triggers to reference service control functionality in standard manner. The solution requires modification to the ISUP IAM message to add in a Generic Address Parameter (GAP) and a Forward Call Indicator (FCI). The general operation of the LRN number portability proposal will become clear from the following description given with reference to FIG. 5.

Figure 5:
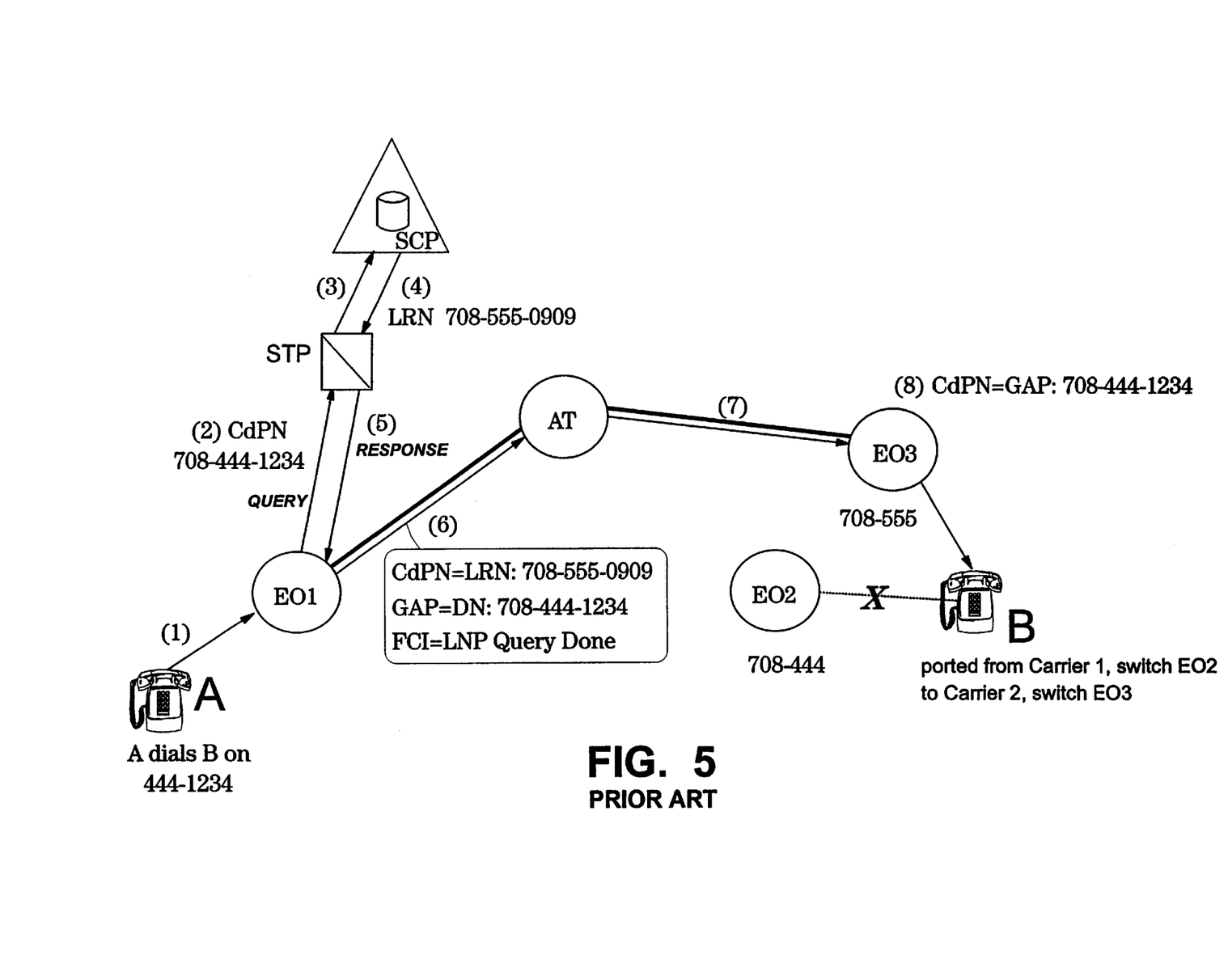
FIG. 5 is a diagram showing the operations involved in implementing the switch-based LRN number portability proposal described above.

In FIG. 5, party A is connected to switch EO1 of carrier C1 ("EO" standing, of course, for "End Office"). Party B was previously connected to switch EO2 of carrier C1 but has now ported (moved) to carrier C2 and is currently connected to switch EO3 of carrier C2. Before B ported to carrier C2, B's number was "708-444-1234", the "708-444" part of this number indicating the switch; when A dialled B, the switch EO1 simply routed the call direct to switch EO2 based on the "444" part of the dialled number. After B has ported, B is connected to switch EO3 which is identified by "708-555". The objective of number portability is to enable A to continue to dial B using the number "708-444-1234" (it being appreciated that the "708" part of the number will not need to be dialled by A). The operations that follow the dialling of "444-1234" by A will now be described, these operations being indicated by bracketed reference numbers in FIG. 5:

(1) EO1 examines the dialled digits and determines that the dialled number (DN) relates to switch EO2 which is a donor EO (that is, some subscribers have been ported from this EO). Of course, carrying out this determination requires that every switch must perform an internal lookup to determine whether the DN is destined for a donor EO.

(2),(3) An LNP SCP database lookup is now performed to determine if the Called Party Number CdPN is ported.

This lookup is done by sending an LNP query message to the SCP in the form a TCAP/SCCP Unitdata message. Typically, this query message will be routed via an STP as illustrated.

(4),(5) The SCP after performing an LNP database lookup returns an LNP response message, in the form of a TCAP/SCCP Unitdata message, containing the LRN found by the database lookup. If the customer has ported the LRN will be different from the original CdPN whereas for non-ported customers the LRN will be the same as the original CdPN (in this latter case, the response message could simply include a "not ported" indicator rather than any number).

(6),(7) The LNP response message tells EO1 whether the DN is for a ported customer and, if so, the LRN of the customer. Assuming the DN is for a ported customer, EO1 routes the call based on the LRN routing tables. The chosen route will generally be via an Access Tandem as the call is destined for a different carrier. Once a route is selected, switch EO1 prepares an IAM with the following substitutions: CdPN=LRN, GAP= DN and FCI=LNP Query Done. The IAM is then transmitted.

(8) When the IAM arrives at the recipient switch EO3, a check is performed on the FCI and GAP. In the present example, this check indicates that the IAM relates to a ported customer and so EO3 must substitute CdPN= GAP and then perform a lookup on the CdPN to establish the physical connection to the CPE (Customer Premises Equipment).

As described, the above method relies on the originating switch (here EO1) querying a LRN database before initiating every call. Considering the small number of customers who are expected to port their numbers, this approach (the "originating trigger" method) results in highly inefficient use of valuable network resources. As an alternative, the originating switch can be arranged to attempt to terminate each call to the switch indicated in the dialled number DN; most calls will complete successfully and only in the event that a call fails because of a call attempt to a ported DN will a LRN database lookup be made. There are two main versions of this "call dropback" method which differ in where the LRN lookup is done. In the first version, the donor switch (i.e. the switch where the ported number originally resided) does the lookup and passes back the LRN to the originating switch in an enhanced release message. In the second version, it is the originating switch that does the lookup after receiving a release message from the donor switch indicating that the DN has ported.

In a typical telephone network there will only be a few SCPs 13 to service the requests of the substantially larger number of SSPs 11. As the number of services available to customers grows, the SCPs present a potential bottleneck. Of course, more SCPs could be provided to handle the extra service requests but this is an expensive solution and one requiring long term planning. What is required is a way of increasing the service request handling capacity of the signalling system without massive investment and planning.

EP-A-0 669 771 discloses a message interceptor for intercepting messages sent to an SCP and selectively effecting pre-processing of the messages (for example, to effect syntax translation or decryption) before forwarding the messages to the SCP; the message interceptor thus serves to relieve the SCP of some of its processing tasks and thereby enables the SCP to handle an increased number of service requests. Unfortunately, the opportunity to effect significant preprocessing is frequently absent. In addition, the number of messages to be processed by the SCP is not changed by this preprocessing approach (EP-A-0 669 771 does also describe the selective suppression of messages to relieve the SCP of load but this, of course, does not assist in solving the problem of answering the service request).

SUMMARY OF THE INVENTION

According to one aspect of the present invention, there is provided a method of relieving the loading of a service function node to which query messages are addressed over a telecommunications signalling network from a querying entity, said query messages each including source and destination data and giving rise to corresponding response messages returned to said querying entity over said signalling network; said method comprising the steps of:

(a) intercepting messages on at least one link of said signalling network and selecting from the intercepted messages at least certain of said query messages addressed to the service function node, (b) for each selected query message, generating appropriate response data, (c) replacing each said selected query message with a response message including said response data, the response message having its destination data set to the source data of the corresponding query message, and (d) forwarding on over the signalling network the response messages provided in step (c).

According to another aspect of the present invention, there is provided apparatus for relieving the loading of a service function node to which query messages are addressed over a telecommunications signalling network from a querying entity, said query messages each including source and destination data and giving rise to corresponding response messages returned to said querying entity over said signalling network; said apparatus comprising:

means for intercepting messages on at least one link of said signalling network and selecting from the intercepted messages at east certain of said query messages addressed to the service function node, means for generating, for each selected query message, appropriate response data, means for replacing each said selected query message with a response message including said response data, the response message having its destination data set to the source data of the corresponding query message, and means for forwarding on said response messages ever the signalling network.

According to a further aspect of the present intention, there is provided a telecommunications system including a signalling network with signalling transfer points, a service function node connected to said signalling network for receiving query messages and returning corresponding response messages, and a querying entity connected to said signalling network for addressing query messages to said service function node and receiving back therefrom said corresponding response messages, each said query message including source and destination data; said system further comprising:

means connected into a link of said signalling system to intercept messages carried by that link, said link being one carrying query messages en route for said service function node via a said signalling transfer point of said signalling network, means for selecting from the intercepted messages at least certain of said query messages addressed to the service function node, means operative for each selected query message, to generate appropriate response data, means for replacing each said selected query message with a response message including said response data, the response message having its destination data set to the source data of the corresponding query message, and means for forwarding on said response messages over the signalling network towards said signalling transfer point.

BRIEF DESCRIPTION OF THE DRAWINGS

Methods embodying the invention for relieving the loading of a service function node in a telecommunications signalling network will now be described, by way of non-limiting example, with reference to the accompanying diagrammatic drawings, in which.

BEST MODE FOR CARRYING OUT THE INVENTION

Figure 6:
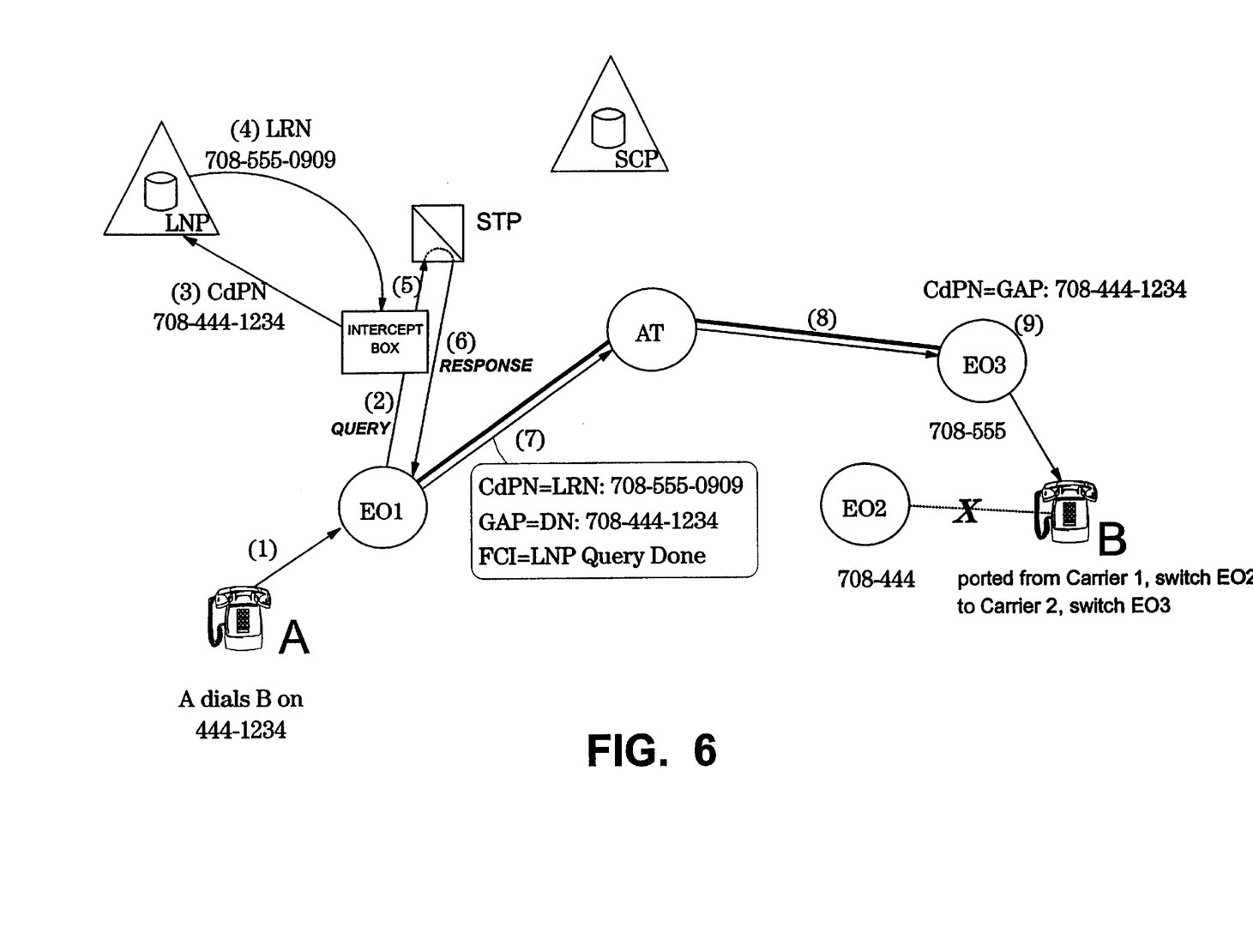
FIG. 6 is a diagram showing the operations involved in implementing number portability in accordance with this invention and using a message interceptor.

A method according to the invention for relieving the loading of an SCP is described below, with reference to FIG. 6, in relation to a local number portability service taken as an example service. The described method utilises a message interceptor disposed in an SS7 signalling link. The message interceptor detects LNP query messages destined for the SCP, services each such query by performing an LNP database lookup, and forwards an appropriate response message with the destination point code of this message set to the originating point code of the query message. The response message is then looped back to the originating switch. A suitable form of message interceptor is also described with reference to FIGS. 7 to 9.

LNP Service Example

The method of the invention will be illustrated by reference to the provision of an LNP service in the same circumstances as described above with reference to FIG. 5, namely where a party A (EO1) is attempting to contact B who has now ported from carrier 1 (EO2) to carrier 2 (EO3). The objective is to relieve the SCP from having to perform the LNP lookup. The process of service implementation, shown in FIG. 6, proceeds as follows:

(1) EO1 examines the dialled digits and determines that the dialled number (DN) relates to switch EO2 which is a donor EO (that is, some subscribers have been ported from this EO). Of course, carrying out this determination requires that every switch must perform an internal lookup to determine whether the DN is destined for a donor EO.

(2) EO1 next launches an LNP SCP database, query in the form of a TCAP/SCCP Unitdata message, to determine if the Called Party Number CdPN is ported.

(3),(4) A message interceptor intercepts the MSU traffic from the links between EO1 and the STP. This is done on a per-link basis. For each LNP query message detected, an LNP database lookup is performed across a data network to determine if the Called Party Number (CdPN) is ported. The database returns an LRN. For non-ported customers the LRN will be the same as the original CdPN. However, if the customer has ported the LRN will be different from the original CdPN.

(5) The message interceptor now prepares an LNP response message, in the form of a TCAP/SCCP Unitdata message, which will contain the LRN where the DN is for a ported customer (where the DN is not for a ported customer, either the DN or some other "not-ported" indicator will be included in the response message). The OPC and DPC of the response message are respectively set to the DPC and OPC of the corresponding intercepted LNP query message. The LNP response message is then forwarded on by the message interceptor to the STP.

(6) At the STP the LNP response message is looped back to the originating switch EO1.

(7),(8) The LNP response message tells EO1 whether the DN is for a ported customer and, if so, the LRN of the customer. Assuming the DN is for a ported customer, EO1 routes the call based on the LRN routing tables. The chosen route will generally be via an Access Tandem as the call is destined for a different carrier. Once a route is selected, switch EO1 prepares an IAM with the following substitutions: CdPN=LRN, GAP= DN and FCI=LNP Query Done. The IAM is then transmitted.

(9) When the IAM arrives at the recipient switch EO3, a check is performed on the FCI and GAP. In the present example, this check indicates that the IAM relates to a ported customer and so EO3 must substitute CdPN= GAP and then perform a lookup on the CdPN to establish the physical connection to the CPE (Customer Premises Equipment).

Although the use of the message interceptor to effect LNP lookup is described above in relation to the "originating trigger" LNP approach, it will be appreciated that the operation of the message interceptor is the same in relation to the "call dropback" LNP approach.

It will be apparent from the foregoing that the SCP is not involved in the LNP query/response transaction and has therefore been relieved of loading. The SCP will generally still retain an LNP lookup capability and, indeed, may be required to provide this function for LNP queries launched towards the SCP along signalling paths not involving the message interceptor; ideally, though, all paths to the SCP would include a message interceptor capable of effecting LNP lookups.

Placing the message interceptor such that an STP lies between it and the SCP results in the SCP being relieved even of the low-level task of re-routing the response messages output by the message interceptor as it is the STP that loops these messages back to the originating switch.

However, even without an interposed STP, the message interceptor reduces the loading on the SCP.

The LNP database accessed by the message interceptor may be shared with the SCP or may be a separate copy.

For each link monitored, the message interceptor monitors all MSUs to detect those query MSUs for which it has to take action. For the above example, these are LNP query MSUs addressed to the indicated SCP; these MSUs are detected by looking at the various message type labels nested in the MSU (SCCP message type, TCAP and INAP message types) to determine if the MSU is an LNP query, and by looking at the addressing information (destination point code/SCCP global title) to determine whether the query is intended for the SCP of concern. The message interceptor could be arranged to take action in respect of all LNP queries detected regardless of the destination SCP but to guarantee success in this case would require the message interceptor to have access to all possible LNP databases that could be relevant to a detected query.

It will, of course, be appreciated that the message interceptor could be arranged to service a different type of query provided that suitable database resources were available. Indeed, the message interceptor could be arranged to service several query types that may be associated with the same or different SCPs, again provided that appropriate resources were available.

It may also be noted that the SCP being relieved of load could potentially be a "phantom" SCP having no real existence but merely a virtual presence established by virtue of a corresponding signalling point code to which queries are addressed and by the action of the message interceptor(s) relieving the phantom SCP of load.

The Message Interceptor

The message interceptor can be of the general form described in EP-A-0 669 771 in which a signalling link is effectively split into two links by the interceptor, the interceptor operating independent link-level protocol engines for exchanges with the two ends of the interrupted link. A message interceptor of this form whilst effective, is relatively complicated. A simpler form of message interceptor will now be described below with reference to FIGS. 7, 8 and 9.

Figure 7:
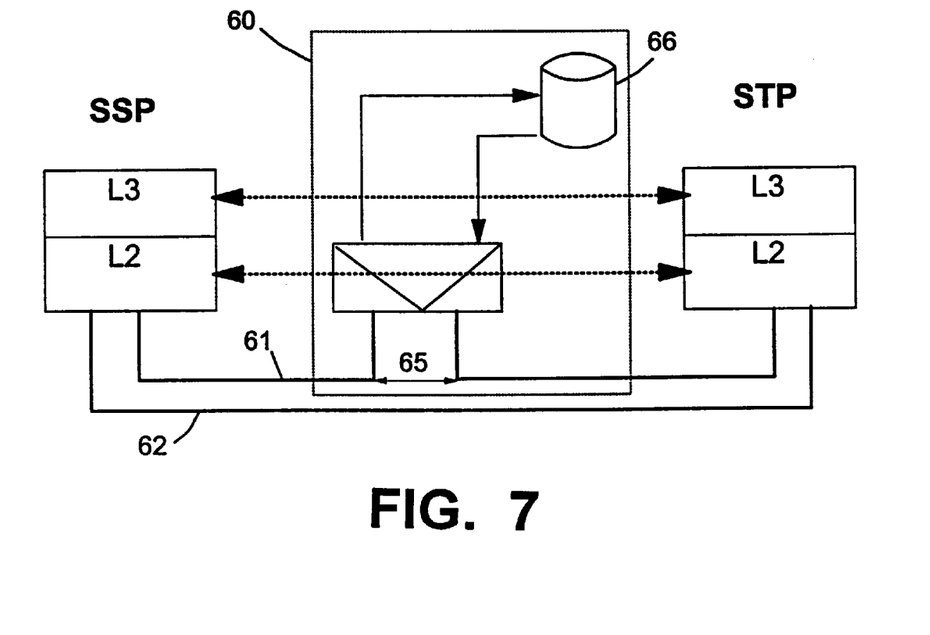
FIG. 7 is a diagram showing the operational placement of the message interceptor.

FIG. 7 illustrates the general disposition of a message interceptor 60 in one channel 61 of a bi-directional link between an SSP and an STP, this channel 61 passing messages from the SSP to the STP. Messages on the channel 61 are routed through the message interceptor 60 and in effect enter a delay pipe subjecting them to a delay $T_{pmsu}$ (see FIG. 8 which depicts both a message P flowing from SSP to STP along the channel 61 and a return message Q flowing in the opposite direction on the channel 62 which does not pass through the interceptor 60 so there is no delay $T_{pmsu}$ in this channel).

Figure 8:
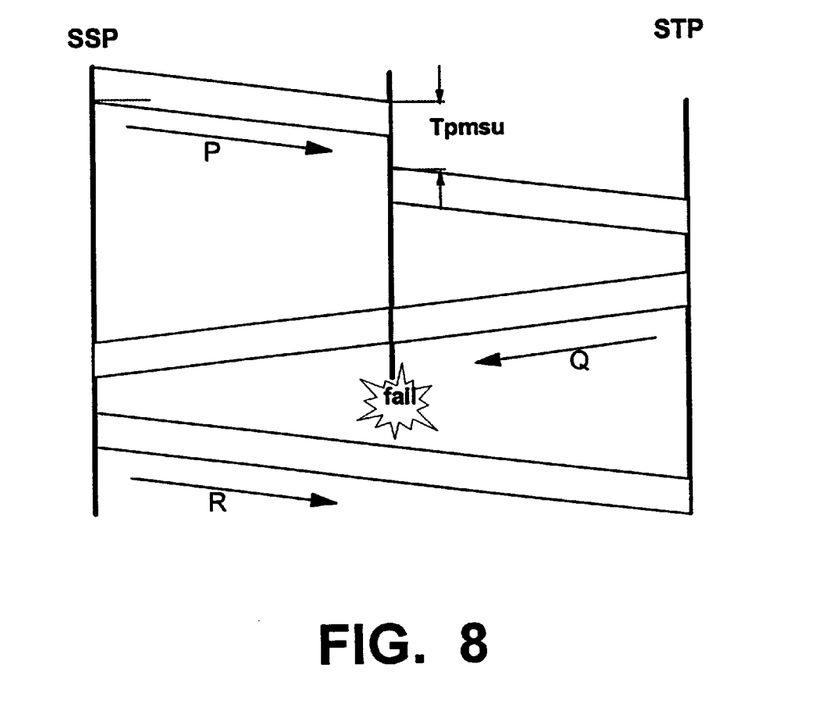
FIG. 8 is a time diagram illustrating the delay $T_{pmsu}$ introduced by the message interceptor.

A bypass relay arrangement 65 permits the interceptor 60 to be bypassed in fault conditions and in this case there will, of course, be no delay $T_{pmsu}$ in messages passing along the channel 61 (see message R in FIG. 8).

A key feature of the message interceptor 60 is that it does not modify MTP Level 2 state-based protocol procedures viz. backward error correction and flow control; it may, however, modify error checking and delimitation procedures which are stateless transformations.

The act of switching the relay arrangement 65 to bypass the interceptor 60 in the event of failure will be seen as bit errors which are corrected by level 2 backward error correction procedures in the STP and SSP. Thus the SSP and STP will generally remain in synchronism in the event of failure of the interceptor 60.

During normal operation of the message interceptor, as each message passes through the interceptor it is examined by comparing its type and possibly the values of particular parameters and destination data with trigger condition data held by the message interceptor to see if the message is a query message to which the message interceptor is intended to respond. If the message interceptor is triggered to respond, it will take appropriate action to derive the required response data such as by effecting a database lookup in a database 66, possibly on an external server (though where appropriate a local cache memory may be provided of sufficient size to hold the database). Once the response data are derived, the query message is modified to a response message by inserting the response data and swapping the destination and originating point codes in the routing label of the message. The message is then forwarded.

Figure 9:
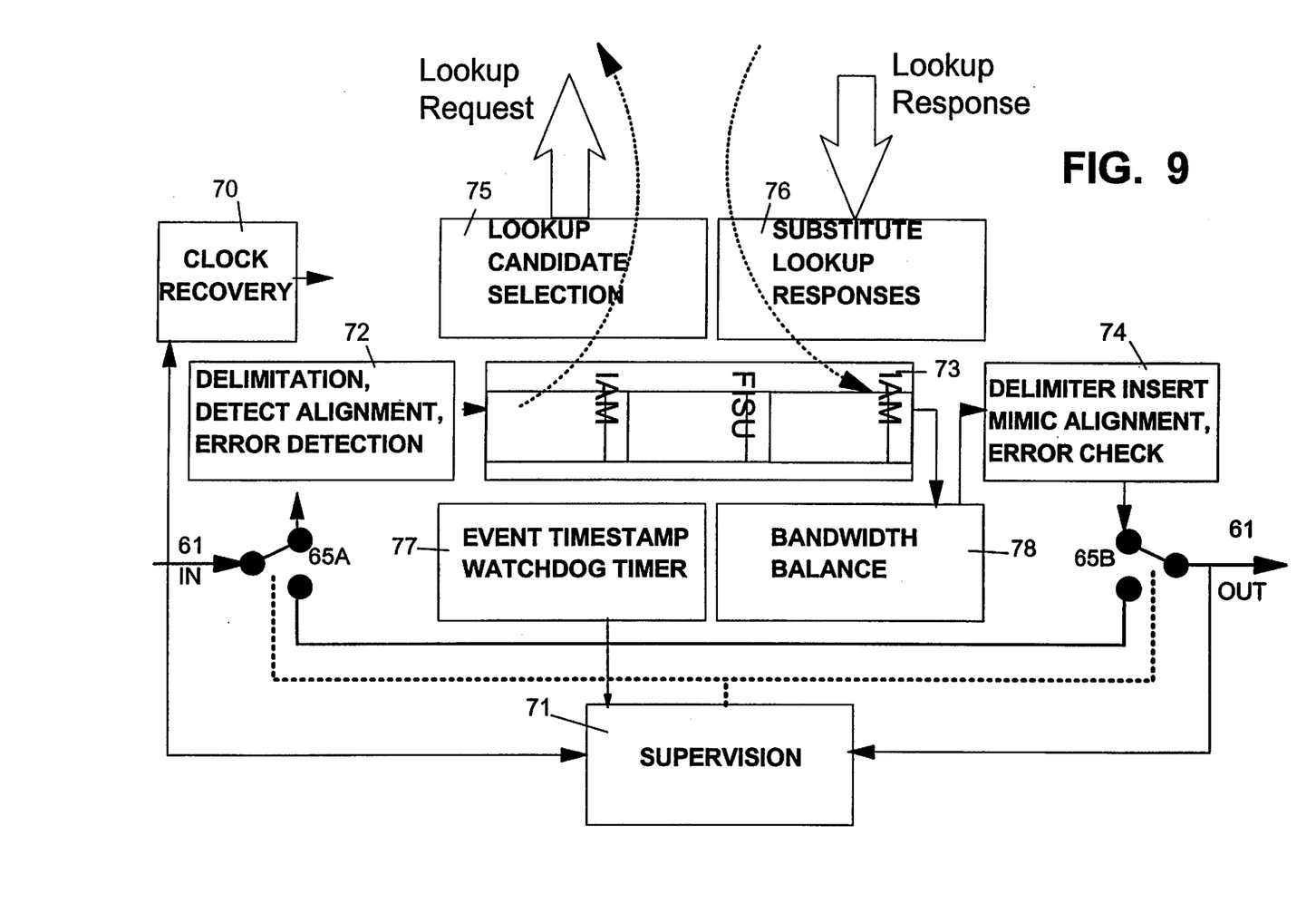
FIG. 9 is a block diagram showing the main functional units of the message interceptor.

FIG. 9 is a functional block diagram of the message interceptor 60. The message interceptor comprises the following units:

Relays 65A, 65B These are the bypass (or pass-thru) relays for bypassing the interceptor when non-operational. The relays are controlled by a supervision unit 71 (see below).

Clock recovery unit 70 This unit recovers clocking information from the line 61 to synchronise operation of the units of the interceptor (in particular, units 72 and 74) with the line 61.

Delimitation, alignment detection and error detection (receive) unit 72 This unit serves to read in messages from the line 61-in; to this end, the unit 72 carries out the following functions:

acquires MTP L2 message frames de-limited by flags and strips bits inserted for data transparency;

checks the frame meets MTP L2 criteria for frame length and that the CRC-16 check is correct; such frames are tagged as 'good';

traffic which fails the above criteria is tagged as 'errored';

in either case traffic is appended to a delay pipe 73 (see below) an octet at a time.

Delay Pipe 73 As already indicated, the intercepted messages are effectively passed through a delay pipe; in practice, this "pipe" is implemented by storing the messages in known memory locations and using pointers to provide a delay pipe type function.

Delimiter insert, mimic alignment and error check insert (transmit) unit 74 This unit serves to output messages from the delay pipe 73 onto the line 61-out; to this end, the unit 74 carries out the following functions:

delimits frames with flags;

inserts stuffed bits for data transparency;

calculates the CRC-16 check for the frame; appends the CRC-16 check to frames tagged as 'good'; appends the ones complement of the CRC-16 check to frames tagged as bad;

tracks the alignment of the receiver; if an event occurred which caused the receiver to enter octet counting mode (long frame, abort, short frame) then it is replicated by the transmitter.

Timestamping Unit 77 Message frames are timestamped on receipt of the first octet, the timestamp register being driven by the recovered clock information from the unit 70. A watchdog timer checks if the timestamp register is running and instructs the supervision unit 71 (see below) to place the relays 65A, 65B in pass-thru (bypass) mode if no clock is found.

Lookup candidate selection unit 75 This unit has INAP/TCAP/SCCP knowledge to allow it to detect particular message types (notably, but without limitation, Unitdata messages carrying INAP queries) and to extract the parameter values of interest (notably, but without limitation, called party numbers). Thus, in relation to the FIG. 6 example, upon the unit 75 detecting an LNP lookup query, it will initiate a lookup in the database 66 (FIG. 7) against the extracted "called party number" parameter value as soon as the latter is available. Lookups can be distributed between servers e.g. by using the first digit of a local number to decide which server to use. Fault tolerant lookups are also feasible by effecting multicast lookup to primary and secondary servers. Lookups may be transmitted via a LAN to a server or may be directed to a cache on board the interceptor. Only messages tagged as good are examined by the unit 75, those tagged as bad being passed through the interceptor unchanged.

Substitute lookup responses Unit 76 This unit effects any required modification to a message. A message will be modified if it triggered the message interceptor to look up response data; in this case the message is modified by including the response data in the message, changing the message type to indicate that it is a response to the query, and swapping the destination and originating point codes in the routing label. Such changes may, of course, cause the message frame length to increase and it is then the responsibility of the unit 76 to make any required adjustments to the length indicators and to the messages' internal pointers.

Bandwidth balance Unit 78 This unit checks if the timestamp of the frame at the head of the delay pipe was received at a time interval $T_{pmsu}$ (the pipe delay constant) before the time currently shown in the timestamp register. Let us call this difference $T_{diff}$. The unit 78 endeavours to keep the delay through the interceptor as constant as possible to prevent excessive jittering of the link throughput which could make queuing delays at the STP erratic and subsequent modelling difficult. The unit 78 operates according to the following rules:

if the difference is equal to or slightly greater than $T_{pmsu}$ then the frame is passed to the transmit unit 74;

if the difference is significantly larger than $T_{pmsu}$ then the delay pipe has grown owing to an increase in length of the preceding frame which in turn was caused by a lookup substitution. Several strategies are available to recover bandwidth and these are applied in the following order:

1. Use gaps between frames: if the time difference between the timestamps of the first and second messages (frames) in the queue is greater than the time it would take to transmit the first message in the queue, then the first message is passed to the transmit chain. The net effect on the link is a delay in receiving the message equal to the time it took to transmit the octets added to the previous message.
2. Delete a FISU: if there is a FISU at the head of the queue then it can be deleted without being transmitted, without affecting L3 data flow, because all the following conditions hold:
    (a) FISUs don't transfer L3 data;
    (b) the FSN information is only significant for MSUs;
    (c) the FIB indication is only significant for MSUs;
    (d) the BSN acknowledgement is caught by the BSN of the next frame;
    (e) the BIB indication is replicated in the BIB of the next frame; and
    (f) a frame must be following (thus guaranteeing (d) and (e)), because strategy 1 above failed.
3. Delete FISU and shift back: if an FISU can be found in the queue then it can be deleted according to the procedure above. The timestamps of all frames which precede the deleted FISU should be incremented by the time it would take to transmit the FISU.
4. Delete an MSU: by deleting an MSU at the head of the queue bandwidth for the preceding frame will be allocated. The MTP flow control procedure at the STP side of the message interceptor will then detect a missing sequence number and request re-transmission.

Supervision unit 71 This unit monitors both the incoming and outgoing streams and if any of the situations listed below occurs then the relays 65A, 65B are returned to pass-thru mode:

1. Error conditions are not passed through
2. Frames experience a delay significantly less than or greater than $T_{pmsu}$
3. A sequence of two or more frames arriving on the incoming stream has two or more frames deleted on the outgoing stream
4. A message encoding rule has been broken on the traffic on the outgoing stream
5. An excessive number of re-transmitted frames is received on the incoming stream. (This may be due to a hardware failure in the transmitter so the unit should be taken out of service as a precautionary measure).

It will be appreciated that the part of the message interceptor responsible for message input and output, the delay pipe, service trigger checking, and message modification, can be replicated and arranged in parallel to provide protection of the link during board swaps etc. The message modification portion of the interceptor may be replicated by itself with the replicated portions being arranged in parallel to increase modification throughput.

The message interceptor 60 is described in further detail in our copending UK patent application no. 96 15 998.3.

Variants

It will be appreciated that many variants are possible to the above described embodiments. Thus, for example, rather than intercepting the signalling messages as they pass along a link, they could equally be intercepted as they pass through an STP; the mechanisms involved in intercepting messages at an STP are very similar to those described in EP-A-0 669 771.

Although the above description relates to an SS7 signalling network, it will be appreciated that the message interceptor and the method of the invention could be arranged to operate with other, similar, signalling networks. In particular, it is possible to vary the physical and link levels from those generally specified for an SS7 network. Thus the message interceptor and method of the invention may be applied to a signalling network in which the basic link transport mechanism is based on ATM technology, the higher levels still being SS7 conformant.

We claim:

1. A method of relieving the loading of a service function node to which query messages are addressed over a telecommunications signalling network from a querying entity, said query messages each including source and destination data and giving rise to corresponding response messages returned to said querying entity over said signalling network; said method comprising the steps of:

(a) intercepting messages on at least one link of said signalling network and selecting from the intercepted messages at least certain of said query messages addressed to the service function node;

(b) for each selected query message, generating appropriate response data;

(c) replacing each said selected query message with a response message including said response data, the response message having its destination data set to the source data of the corresponding query message; and (d) forwarding on over the signalling network the response messages provided in step (c), said response messages being forwarded in a direction corresponding to that in which said query messages were traveling when intercepted in step (a).

2. A method according to claim 1, wherein said query messages each include a query type indicator, step (a) involving selecting all query messages that have a predetermined query type indicator.

3. A method according to claim 1, wherein said query messages each include a query type indicator, step (a) involving selecting only those queries that are both addressed to said service function node and are of one or more predetermined types.

4. A method according to claim 1, wherein said service function node has only virtual presence as an address for said query messages.

5. A method according to claim 1, wherein step (b) involves looking up said response data in a database, said database being shared with said service function node.

6. A method according to claim 1, wherein step (a) is carried out on messages en route for said service function node via a signalling transfer point of said signalling network, said response messages being forwarded in step (d) to said signalling transfer point and the latter serving to redirect said response messages back to said querying entity.

7. A method according to claim 1, wherein said selected query messages relate to local number portability and each contain a called party number, step (b) involving, where said called party number is a ported number, providing as said response data a location routing number indicative of a switching point from which the called party currently depends.

8. A method according to claim 1, wherein the passing of said messages over said at least one link of the signalling network is effected in accordance with a link-level protocol having state, steps (a) and (d) being effected without affecting the current state of the link-level protocol on the link concerned.

9. A method according to claim 1, wherein the passing of said messages over said at least one link of the signalling network is effected in accordance with a link-level protocol having state, steps (a) and (d) being effected by setting up independent link-level protocol exchanges with each end of the link concerned whereby in step (a) said query messages are intercepted by reception from one end of the link in accordance with the link-level protocol operated therewith, and in step (d) the response messages are forwarded by transmission to the other end of the link in accordance with the link-level protocol operated therewith.

10. Apparatus for relieving the loading of a service function node to which query messages are addressed over a telecommunications signalling network from a querying entity, said query messages each including source and destination data and giving rise to corresponding response messages returned to said querying entity over said signalling network; said apparatus comprising:

means for intercepting messages on at least one link of said signalling network and selecting from the intercepted messages at least certain of said query messages addressed to the service function node;

means for generating, for each selected query message, appropriate response data;

means for replacing each said selected query message with a response message including said response data, the response message having its destination data set to the source data of the corresponding query message; and means for forwarding on said response messages over the signalling network, said response messages being forwarded in a direction corresponding to that in which said query messages were traveling when intercepted in step (a).

11. A telecommunications system including a signalling network with signalling transfer points, a service function node connected to said signalling network for receiving query messages and returning corresponding response messages, and a querying entity connected to said signalling network for addressing query messages to said service function node and receiving back therefrom said corresponding response messages, each said query message including source and destination data; said system further comprising:

means connected into a link of said signalling system to intercept messages carried by that link, said link being one carrying query messages en route for said service function node via a said signalling transfer point of said signalling network;

means for selecting from the intercepted messages at least certain of said query messages addressed to the service function node;

means operative for each selected query message, to generate appropriate response data;

means for replacing each said selected query message with a response message including said response data, the response message having its destination data set to the source data of the corresponding query message; and means for forwarding on said response messages over the signalling network in a direction corresponding to that in which said query messages were traveling when intercepted in step (a), via said signalling transfer point.

* * * * *